United States Patent [19]

Marvin et al.

[11] 4,210,361
[45] Jul. 1, 1980

[54] SLIDING COVER ASSEMBLY FOR OPEN BODY TRUCKS

[76] Inventors: Herbert Z. Marvin, 9860 SW. 102nd St.; Edmond L. Lohman, 9644 SW. 99th St., both of Miami, Fla. 33176; Robert C. Lohman, 3570 SW. 123rd Ct., Miami, Fla. 33175

[21] Appl. No.: 16,838
[22] Filed: Feb. 28, 1979
[51] Int. Cl.² .............................................. B60J 7/10
[52] U.S. Cl. .................................. 296/210; 296/100; 296/219
[58] Field of Search .................... 296/100, 137 B, 105, 296/109, 98, 137 C, 137 D, 140, 141

[56] References Cited

U.S. PATENT DOCUMENTS

| 1,280,272 | 10/1918 | Montroy | 296/141 X |
| 3,649,072 | 3/1972 | Cross | 296/137 B |
| 3,986,749 | 10/1976 | Hull et al. | 296/100 X |
| 4,138,154 | 2/1979 | McKeon | 296/98 |

*Primary Examiner*—John J. Love
*Assistant Examiner*—Norman L. Stack

[57] ABSTRACT

A sliding cover assembly for open body trucks consisting of a pair of elongated guides adapted to be mounted on either side of the truck body forming a slide guide for a sheet of corrugated material extending between the slide guides and extending over the open body with a spring operated return drum mounted at the front end of the truck upon which the corrugated cover is wound when access to the truck body is desired. At the rear end of the corrugated cover there is a latch which secures the cover in its covered position.

1 Claim, 11 Drawing Figures

SLIDING COVER ASSEMBLY FOR OPEN BODY TRUCKS

BACKGROUND OF THE INVENTION

1. Field Of The Invention

This invention relates to truck bodies and is more particularly directed to a slide cover assembly for attachment to an open body truck for conversion to a closed body truck.

2. Description Of The Prior Art

There appears to be no conventional sliding cover assemblies for open body trucks which can be mounted on the open body truck to convert the truck to a closed and watertight body truck. At the present time whenever a person having an open body wishes to protect material or articles placed on the truck against rain or theft, he spreads a canvas cover thereover, which fails to adequately protect the material on the truck. The present invention fills this void by providing a sliding cover assembly which is readily attached to the conventional open body truck to convert it to a completely watertight and theftproof closed body truck.

SUMMARY OF THE INVENTION

Therefore, a principal object of the present invention is to provide a sliding cover assembly for open body trucks, that can be readily secured to the truck in converting the truck to a closed body truck.

Another object of the present invention is to provide a sliding cover assembly for open body trucks that render the truck watertight for protection against the weather of the material or articles stored on the truck.

A further object of the present invention is to provide a sliding cover assembly for open body trucks that require very little space on the truck when the assembly is slid to its open position.

A still further object of the present invention is to provide a sliding cover assembly for open body trucks that can be locked in a closed position to protect the material or articles stored on the truck against theft.

With these and other objects in view, the invention will be best understood from a consideration of the following detailed description taken in connection with the accompanying drawings forming a part of this disclosure, with the understanding, however, that the invention is not confined to any strict conformity with the showing of the drawings but may be changed or modified so long as such changes or modifications mark no material departure from the salient features of the invention as expressed in the appended claims.

DESCRIPTION OF THE PREFERRED EMBODIMENTS

Figure 1:
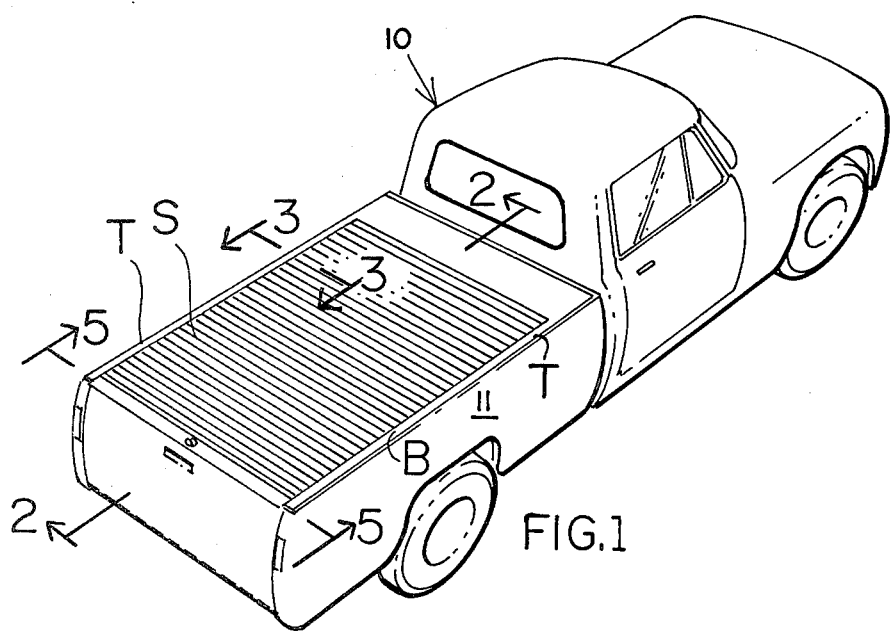
FIG. 1 is a perspective view of an open body truck having a sliding cover constructed and mounted in accordance with my invention.

Referring to the drawings wherein like numerals are used to designate similar parts throughout the several views and in particular to FIGS. 1-6 inclusive, the numeral 10 refers to an open body truck on which my sliding cover assembly -S- has been mounted to convert the open body -B- to a closed body type truck. The open body truck 10 has the conventional open body -B- consisting of a flat bottom 15, side walls 11, a front wall 12 and a tail gate 13 pivotally mounted as at the hinge 14.

To convert the open body -B- of the truck 10 to a closed body, a slide guide or track -T- is mounted on each of the side walls 11, the slide tracks -T- consisting of C-shaped member having top wall and bottom walls 16 and 17 joined by a side wall 18. The top wall 16 is extended beyond the side wall 18 to form a tab 19 that rests on the top of the side 11 of the truck body and is fastened thereto by screws 20. Along the free edge of the bottom wall 17, there is an upwardly extending fore-shortened wall 21 on which a guide 22 made of soft material such as rubber is mounted to permit the slide cover 25 to slide therealong. The slide cover 25 slides between the guide 22 and guide 122 that is mounted on the free edge of the top wall 16 of the track -T-.

At the forward end portion of the truck boyd -B- there is a housing -H- on which a hinged cover 36 is positioned for access to a shaft 23 whose ends are secured against rotation to the side walls of the housing -H-. The slide cover 25 extends to the rear of the truck body through a slot 37 formed between the housing -H- and the rear edge of the cover 36. At each end of the shaft 23 is a disc 24 rotatably mounted thereon. The forward edge of the slide cover 25 is secured as by screws 29 to the discs 24 and is wound thereon as explained in detail hereinafter. A coil spring 26 that is telscopically mounted about the shaft 23 has one end secured to one of the discs 24 as at 27 and at the other end to the mid-portion of the shaft 23 as at 28. The coil spring 26 provides the torsional force required to rotate the discs 24 and wind the slide cover 25 thereon to uncover the body -B- of the truck 10.

Figure 2:
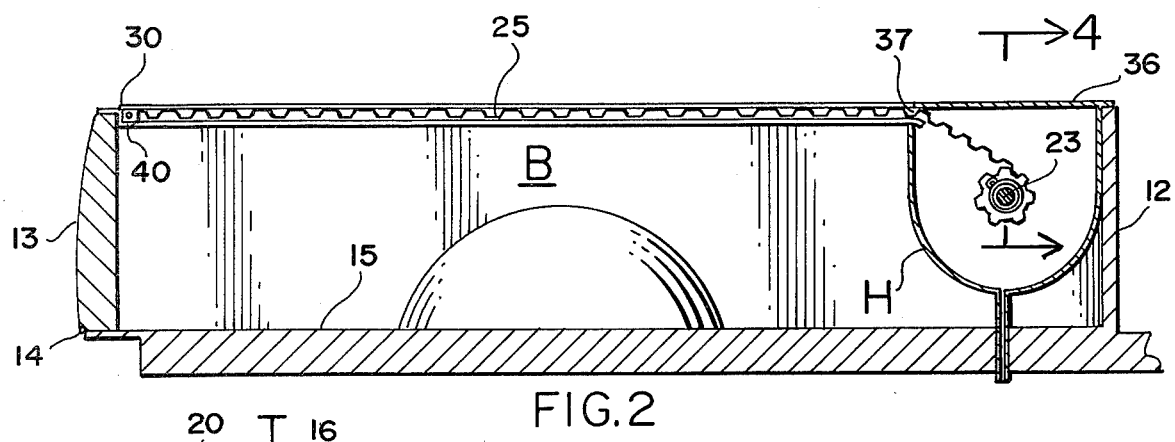
FIG. 2 is a cross sectional view taken along the line 2—2 of FIG. 1.
Figure 3:
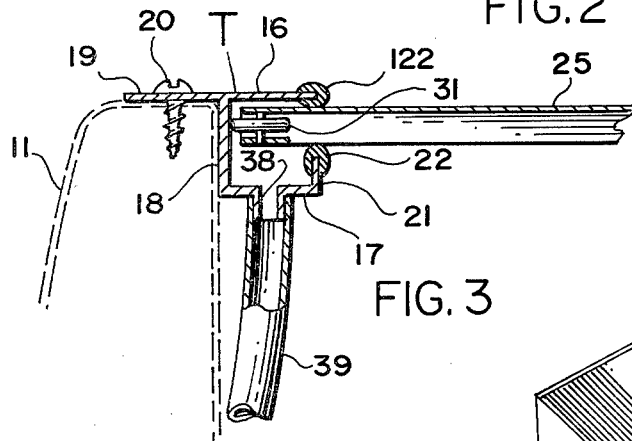
FIG. 3 is a fragmentary cross sectional view taken along the line 3—3 of FIG. 1.
Figure 7:
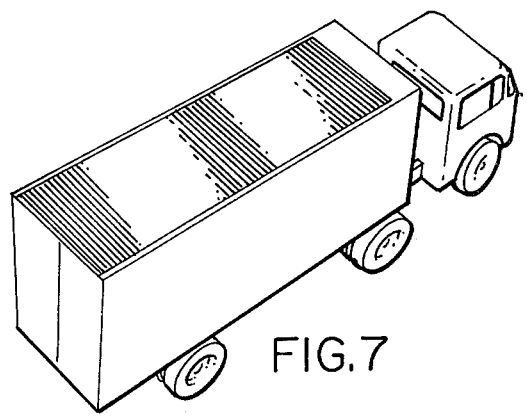
FIG. 7 is a perspective view of a trailer type truck on which is mounted my sliding cover assembly.
Figure 4:
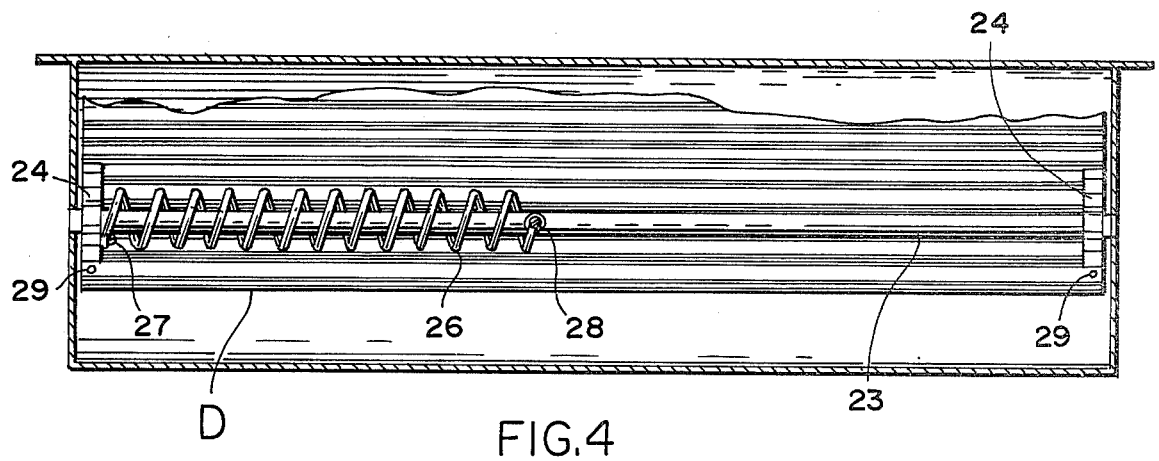
FIG. 4 is a cross sectional view taken along the line 4—4 of FIG. 2.
Figure 5:
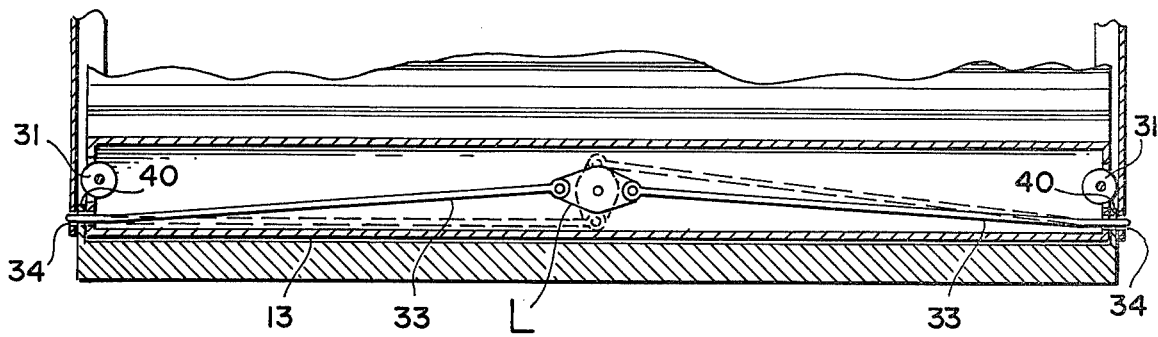
FIG. 5 is a cross sectional view taken along the line 5—5 of FIG. 1.
Figure 6:
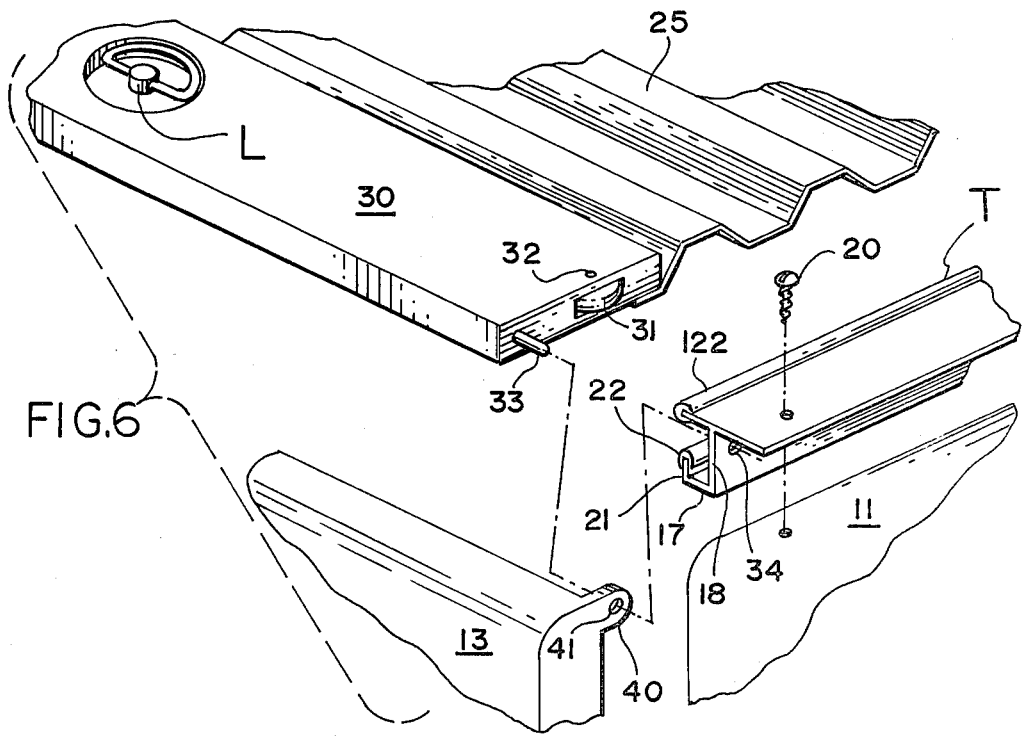
FIG. 6 is an exploded view illustrating the manner of mounting my invention on a truck body.

To the rear end portion of the slide cover 25 there is secured a transverse member 30 whose ends extend into the tracks -T- and slide between the guides 22 and 122. Rollers 31 mounted to rotate as at 32 extend beyond the ends of the transverse member 30 to engage the side wall 18. To secure the slide cover 25 in its closed position, there is a conventional latch -L- mounted on the transverse member 30 having retracting pins 33 that engage openings 34 in the side walls 18. A latch handle 35 permits the retraction of the pins 33 from the openings 34 when it is desired to convert the truck 10 to an open body and to secure the pins 33 in the openings 34 when the slide cover 25 has returned to the covered position as shown by FIG. 2. An opening 38 is positioned in the bottom wall 17 to drain off through drain pipe 39 any rain, moisture and the like that may find its way into the track -T-. It is to be noted that the tail gate 13 is provided with a return or tang 40 at either side edge thereof in contact relation with the inner surface of the side walls 11 of the truck body 10. The tangs 40 are provided with a bore 41 through which the retracting pins 33 extend to lock the tail gate 13 in an upright or closed position.

Figure 8:
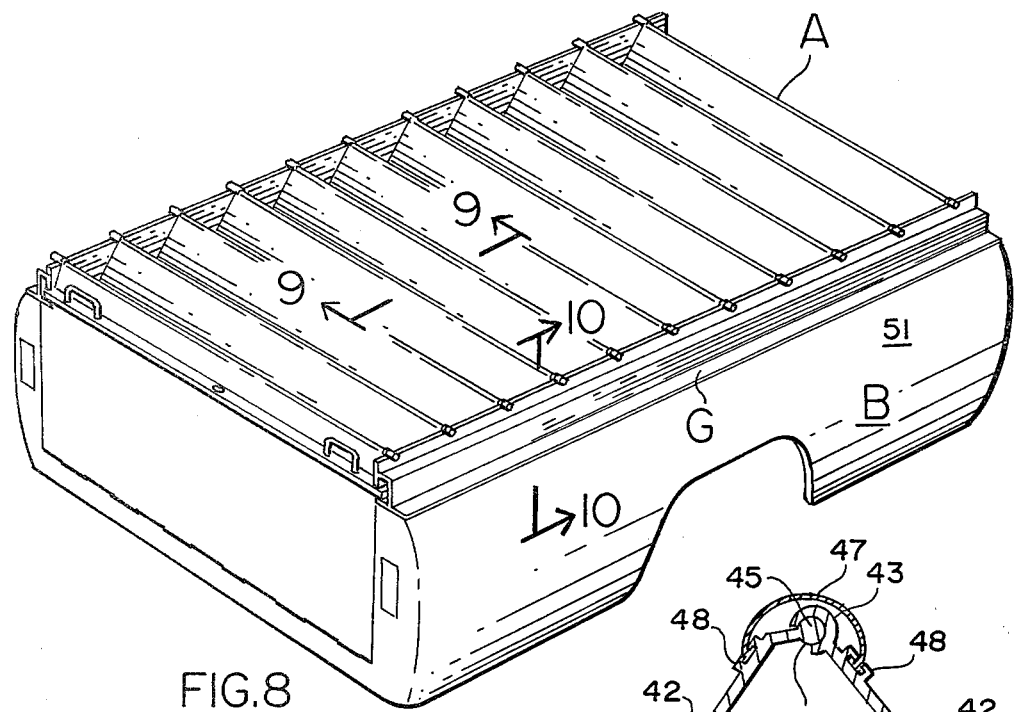
FIG. 8 is a fragmentary perspective view of a truck enclosed by a sliding cover of alternate construction shown in a closed position.
Figure 9:
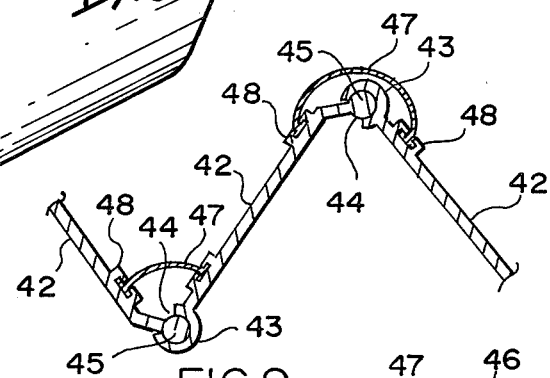
FIGS. 9 and 10 are detailed cross sectional views taken along the lines 9—9 and 10—10, respectively of FIG. 8.
Figure 10:
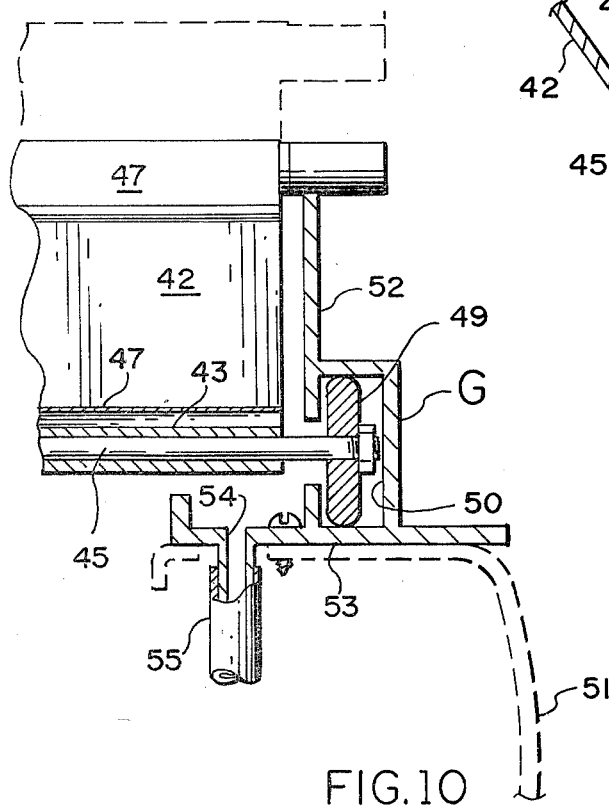
Figure 11:
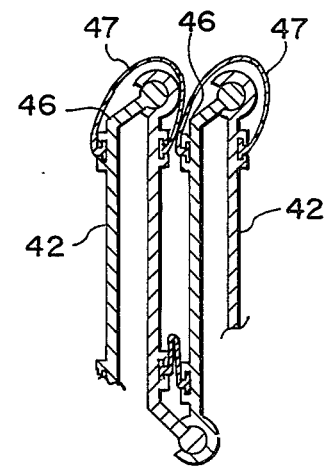
FIG. 11 is a view similar to FIG. 9 showing the cover as it would appear in an open position.

Referring now to FIGS. 8-11 inclusive, my alternate structure to the sliding cover assembly -S- is an articulated type cover with assembly -A- consisting of a plurality of panels 42 extending transversely of the body of the truck. Each of the panels 42 are provided with an arcuate edge portion 43 somewhat cylindrical in shape with an opening 44 along its full length for receiving a cylindrical member such as a shaft 45 mounted at the other and adjacent edge portion of the panels 42. To permit the folding together of the panels 42 one against the other, the panels 42 are bent as at 46 at an obtuse angle as shown by FIG. 11. To prevent any leakage of rain, etc. into the body -B- of the truck 10 when the panels 42 are in a closed or extended position as shown by FIG. 8, strips of waterproof sheet material 47 such as plastic is positioned over the junctures 43, 44 of the panels 42. The edges of the plastic material 47 are engaged by clips 48 to secure the material 47 against inadvertent removal therefrom.

At the ends of the shafts 45 is a wheel 49 rotatably mounted on a track 50 formed in a guide member -G- that is mounted on each of the side walls 51 of the body -B-. The guide member -G- is provided with an upwardly extending wall portion 52 upon which the outer edges of the panels 42 rests and slides along when the articulated cover -A- is moved from one position to the other. The bottom wall 53 is provided with a drain opening 54 for draining water that is collected thereon via a drain tube 55 connected to the opening 54. The dotted lines in FIG. 10 indicate the position of the panels 42 when slid forwardly to their open and vertical position as shown by FIG. 11.

What we claim as new is:

1. A sliding cover assembly for open body trucks having side portions comprising a pair of guide means mounted on said side portions of said open body, a plurality of elongated panels extending across said open body having edge portions slidably mounted in said guide means, each of said elongated panels having a substantially arcuate portion mounted along one edge portion and a cylindrical portion mounted along the other edge portion, said cylindrical portion of each of said panels rotatably received in said arcuate portion of an adjacent panel, said panels being bent at an obtuse angle in proximity of said other edge portion to permit said panels to be positioned in substantially parallel relation when slid to the forward end of said body of said truck, spring actuated return means mounted at a forward end of said open body and connected to the forward edge portion of said pliable cover means, latch means mounted at the rearward edge portion of said pliable cover means for securing said cover means to said truck body in an extended position for converting said open body to a closed body, and clip means mounted on said panels along each side of said pivot means, pliable sheet members extending over said pivot means and having edge portions engaged by said clip means for preventing the seepage of water therethrough.

* * * * *